United States Patent [19]

Klinkowski

[11] Patent Number: 4,759,835

[45] Date of Patent: Jul. 26, 1988

[54] METHOD FOR DISCHARGING CAKE FORMED ON AN ELECTRODE STRUCTURE

[75] Inventor: Peter R. Klinkowski, Norwalk, Conn.

[73] Assignee: Dorr-Oliver Incorporated, Stamford, Conn.

[21] Appl. No.: 771,436

[22] Filed: Aug. 30, 1985

[51] Int. Cl.$^4$ ............................................. B01D 13/02
[52] U.S. Cl. ............................ 204/182.2; 204/182.3; 204/182.4
[58] Field of Search ............... 204/182.3–182.6, 204/301; 210/410, 411; 55/302

[56] References Cited

U.S. PATENT DOCUMENTS

| | | | |
|---|---|---|---|
| 2,332,917 | 10/1943 | Jordan | 210/411 |
| 3,416,669 | 12/1968 | Hubbard | 210/411 |
| 3,794,169 | 2/1974 | Sirk et al. | 210/410 |
| 3,853,508 | 12/1974 | Gordon | 55/302 |
| 3,891,551 | 6/1975 | Tiedemann | 210/410 |
| 4,003,819 | 1/1977 | Kunkle et al. | 204/182.2 |
| 4,101,400 | 7/1978 | Pepping | 204/182.2 |
| 4,107,026 | 8/1978 | Freeman | 204/182.2 |
| 4,168,222 | 9/1979 | Freeman | 204/182.2 |
| 4,170,529 | 10/1979 | Freeman | 204/182.2 |
| 4,207,158 | 6/1980 | Freeman | 204/182.2 |
| 4,244,804 | 1/1981 | Moeglich | 204/182.2 |
| 4,312,729 | 1/1982 | Wills | 204/182.2 |
| 4,376,022 | 3/1983 | Portz et al. | 204/182.2 |
| 4,615,786 | 10/1986 | Culkin | 204/182.3 |

*Primary Examiner*—John F. Niebling
*Attorney, Agent, or Firm*—Gary R. Plotecher; Paul D. Greeley; Burtsell J. Kearns

[57] ABSTRACT

A method and apparatus for discharging a cake of suspended solids formed on an electrode structure, the electrode structure comprising an electrode, a membrane wall, an electrolyte chamber formed by the membrane wall, and means for increasing the pressure inside the electrolyte chamber so that the membrane wall expands, whereby the cake of solids of suspension are discharged therefrom. The means for increasing the pressure inside the electrolyte chamber are injecting gas into the electrolyte chamber, injecting liquid into the electrolyte chamber, and/or reducing the vacuum means applied internally to the electrolyte chamber.

12 Claims, 2 Drawing Sheets

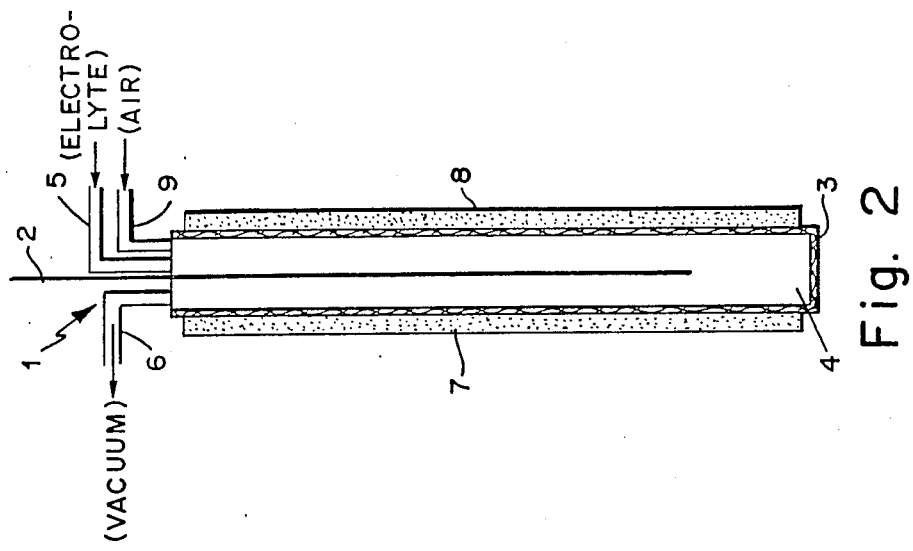
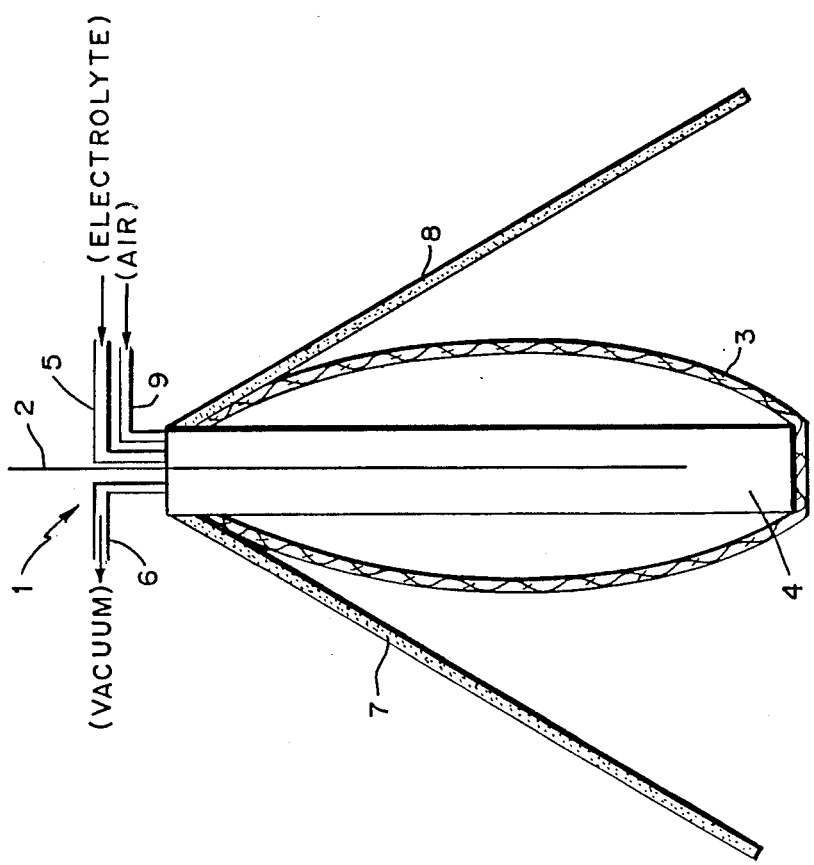

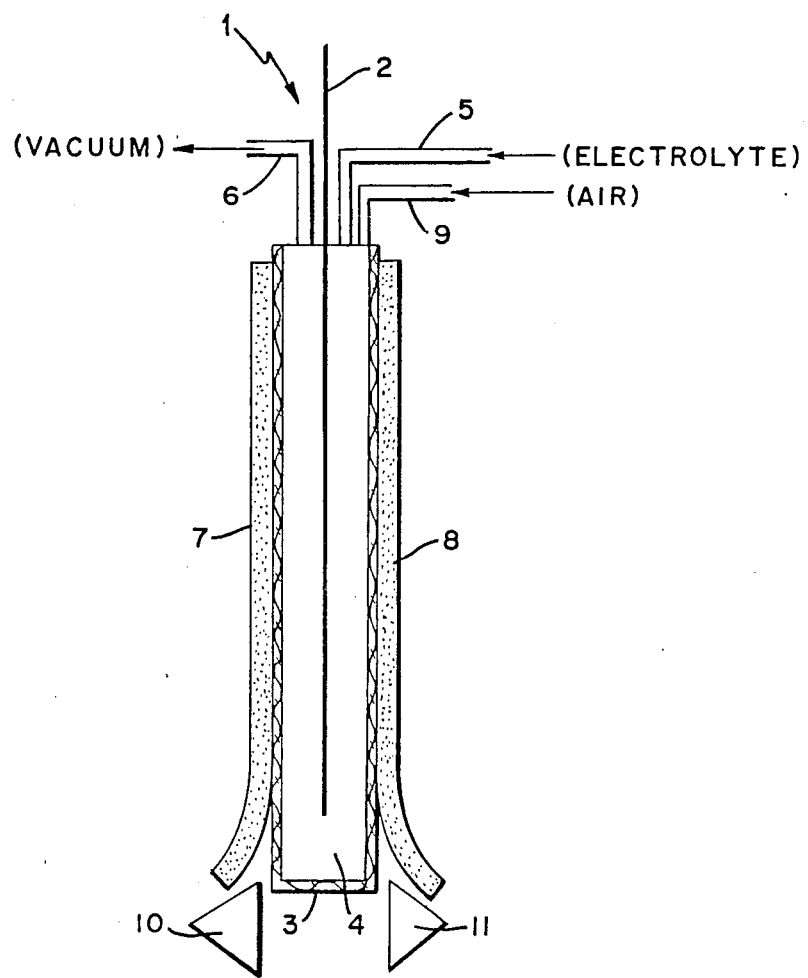

METHOD FOR DISCHARGING CAKE FORMED ON AN ELECTRODE STRUCTURE

BACKGROUND OF THE INVENTION

The present invention provides a novel method and apparatus for discharging a cake of solids formed on an electrode structure. The present invention uses a blowback means for discharging the cake of suspended solid, the blowback means consisting essentially of expansion of the membrane wall by injection of gas or liquid into the electrode structure, and/or removing of vacuum means from the electrode structure. The electrode structure according to the present invention is primarily used in an electrically augmented vacuum filter.

The use of an electrically augmented vacuum filter (hereinafter referred to as EAVF) system for dewatering a suspension of solids in a carrier liquid is described in U.S. Pat. Nos. 4,168,222 and 4,207,158. These patents describe a means for dewatering a suspension of solids in an electric field which is controllably maintained between opposing electrodes, to cause the solids to migrate relative to the carrier liquid to form a layer or cake on one of the electrode structures in which the electrode element is positioned within ion-pervious walls and immersed in a selected electrolyte, while allowing carrier liquid to be withdrawn under vacuum in the opposite direction through the liquid-pervious wall of a hollow, counter electrode structure, and wherein the layer or cake material may be detached from the first electrode structure during exposure from the suspension.

Typically, a vacuum is applied internally to the electrode structure to reduce the internal pressure on the ion pervious wall, such that when the electrode is in the raised position for doctoring of the cake of solids formed thereon, the vacuum prevents the loss of electrolyte and/or rupture of the filter media. The aforementioned patents particularly provide for the use of doctor blades 17 and 18 such that a pair of symmetrically disposed doctor blades swingable about their horizontal axes as between neutral position and cake stripping position. The cake material thus being stripped may be carried away by conveyor means provided therein.

Repetitive scraping of the doctor blade directly on the ion pervious wall may damage the wall surface by abrading, wearing, tearing or ripping. This is especially true when the doctor blade tips have been worn or abraded by hard dry cakes, such as kaolin clay. To prevent engagement of the doctor blades with the electrode ion pervious wall, the blades are normally positioned to leave a cake heel, i.e. ¼ to ½ inch layer of cake on the electrode structure. While this provides for long life of the ion pervious wall, there are some other consequences which negate the benefits. For instance, where the adhesion of the cake to the ion pervious wall is low, the cake heel may subsequently and uncontrollably disengage from the anode, fall into the bath and interfere with the process.

Another problem could occur if the deposited cake is composed of heat sensitive materials. Heat is generated in the cake due to the electric current passing thru it. If the cake is not removed entirely between cycles, heat will build up in the heel until radiation and convective losses equal the generation term. In the case of polymer latex resins, for instance, the temperature of the heel could, after repetitive cycles, exceed the glass transition temperature of the polymer, causing the latex particles to fuse together resulting in an electrically impervious cake heel which catastrophically stops the electrofiltration process.

In yet another case, where the selection of ion pervious wall material results in a cake which is dialyzed over repetitive doctoring cycles. This would result in excessive power losses in the heel, again causing high heat generation, but also, when the conductivity drops low enough, water will split into acid and hydroxide, resulting in an acid flocculated cake.

Thus, it is preferable in some instances to provide means for discharging substantially all of the cake formed on the membrane walls of the electrode structure. It is also preferable for economic reasons to provide a discharge means which does not rip or tear the membrane wall. The present invention provides a method and apparatus which overcomes the aforementioned disadvantages. The present invention also includes many additional advantages which will be further described below.

SUMMARY OF THE INVENTION

It is the primary object of the present invention to provide a method and apparatus for discharging a cake of suspended solids formed on an electrode structure. In particular, it is an object of the present invention to provide blowback or snap blowback means for discharging the cake. The blowback means consisting essentially of expansion of the membrane wall of the electrode structure, such that the membrane wall is expanded by increasing the pressure inside the electrode structure.

According to the present invention, the pressure within the electrode structure is increased so as to expand the membrane walls by injecting either gas or liquid into the electrode structure, and/or by reducing the vacuum means applied to the electrode structure. It is also an object of the present invention that the liquid and gas injected into the electrode structure for increasing the pressure thereof can be electrolyte and air, respectively.

It is a further object of the present invention to provide a method and apparatus for discharging a cake of suspended solids formed on an electrode structure, wherein the electrode structure is part of an electrically augmented vacuum filter. Furthermore, it is an object of the present invention that the electrode structure be removed from a bath of suspended solids prior to discharging of the cake. The electrode may be either a cathode or anode depending on the charge on the solids in suspension.

Additionally, it is an object of the present invention that the membrane wall of the electrode structure upon which a cake of suspended solids is formed is either of a bag or plate configuration.

The present invention may also include many additional features which shall be further described below.

BRIEF DESCRIPTION OF THE DRAWINGS

FIG. 1 is a sectional view of an electrode structure according to the present invention showing a cake being discharged;

FIG. 2 is a sectional view of an electrode structure according to the present invention in its normal cake forming state; and FIG. 3 is a sectional view of another embodiment according to the present invention.

DESCRIPTION OF THE PREFERRED EMBODIMENT

The present invention provides a method and apparatus for discharging a cake of suspended solids formed on an electrode structure, the electrode structure primarily used in connection with an electrically augmented vacuum filter as described in U.S. Pat. No. 4,168,222, issued Sept. 18, 1979 and U.S. Pat. No. 4,207,158, issued June 10, 1980. The electrode structure having self-contained means for discharging the cake formed thereon and no longer requiring the exclusive application of doctor blades to remove the cake formed on the membrane walls. Thus, the present invention overcomes many of the disadvantages found when only doctor blades are applied for removing the cake and provide a simple and economic means for discharging substantially all the cake of suspended solids formed thereon.

The electrode structure 1, as described in FIG. 1, comprises an electrode 2 which may be electrically connected to either a positive or negative power source depending upon the charge of the solids of suspension to be deposited thereon; a membrane wall 3 which has some degree of expandability and which may or may not be pervious to ions; an electrolyte contained within the hollow portion of the electrode structure 1 which is defined by membrane wall 3, such hollow portion designated by numeral 4, the electrolyte being continuously replenished as necessary through conduit 5; a vacuum means being applied internally to electrode structure 1 via conduit 6 to cause electrofiltration flow thru the electrode structure 1 during deposition, to reduce the pressure on the membrane wall 3 when the electrode structure 1 is in the raised position for removing the cake of solids formed thereon and to prevent loss of electrolyte and/or rupture of the membrane wall 3; and a means for discharging cakes 7 and 8 deposited on membrane wall 3.

According to the present invention one means for increasing the pressure inside electrode structure 1 is injecting a gas, such as air, through conduit 9. Others are to inject a liquid, such as electrolyte, through conduit 9 or conduit 5; or reduce the vacuum being applied to the electrode structure 1 via conduit 6, such that the membrane wall 3 expands as shown in FIG. 1 from its normal position which is described in FIG. 2 to discharge substantially all of cakes 7 and 8 deposited thereon.

The membrane wall 3 described in FIG. 1 is of the bag type, but, it is also possible to have a plate-type configuration capable of discharging cakes of suspended solids by blowback means. The membranes may be one selected from a group consisting of anions selective membrane, cations selective membranes, non ion selective membranes, ion pervious membranes, liquid pervious membranes, and liquid impervious membranes. One particularly suitable membrane for use herein is Nafion TM (Trademark of DuPont).

FIG. 2 describes electrode structure 1 as it normally appears during deposition of solids of a suspension. It includes an electrode 2, hollow compartment 4 formed by membrane 3 for containing electrolyte supplied via conduit 5, and cakes 7 and 8 formed on membrane wall 3 by electrophoretic means. A vacuum is applied via conduit 6 to allow electrolyte to flow and, to prevent loss of electrolyte and/or rupture of the membrane wall 3. Gases such as air may be supplied via conduit 9 to act as a blowback means in discharging cakes 7 and 8.

The cakes 7 and 8 are normally discharged when the electrode structure is removed from the bath of suspended solids such that cakes 7 and 8 will fall to a conveyors system of an electrically augmented vacuum filter as described in U.S. Pat. Nos. 4,168,222 and 4,207,158.

FIG. 3 shows another embodiment according to the present invention wherein doctor blades 10 and 11 are applied along with the blowback discharge means to assist in discharging cakes 7 and 8 from electrode structure 1. The embodiment described in figure 3 is preferably used in instances where the solids of suspension deposited as cakes 7 and 8 do not readily pop-off membrane wall 3.

Thus, in instances where the cake properties dictate it has been found that it is advantageous to detach cakes 7 and 8 from the base of the membrane 3 by a positive pulse of electrolyte thru conduit 5, then reapplying a vacuum via conduit 6 to the electrolyte chamber 4 causing membrane 3 to return to its original shape and thereafter lowering the electrode structure 1 thru partially engaged doctor blades 10 and 11. Doctor blades 10 and 11 catch the crimped bottom edges of cakes 7 and 8, the edges being crimped due to the blowback action being applied as above, and peel off cakes 7 and 8 from membrane 3 as the electrode structure 1 passes therebetween.

The blowback means of discharging cakes formed on electrode structures of electrically augmented vacuum filters is particularly useful in discharging cakes formed of PVC latex, but is not limited to such cake formations.

What is claimed is:

1. A method for discharging a cake of suspended solids formed on an electrode structure, said electrode structure comprising an electrode, a membrane wall disposed about said electrode and forming an electrolyte chamber therein, an electrolyte contained within said electrolyte chamber, the improvement characterized by depositing solids of suspension on the surface of said membrane wall of said electrode structure which is facing away from said electrolyte chamber, such that a cake of solids is formed thereon, increasing pressure within the electrode to expand outwardly the membrane wall to separate the cake from the membrane wall, and removing the cake from the membrane wall without scraping the surface of the membrane.

2. The method for discharging a cake according to claim 1, wherein said cake is formed on said electrode structure by the influence of an electric field.

3. The method for discharging a cake according to claim 1, wherein said electrode structure is part of an electrically augmented vacuum filter.

4. The method for discharging a cake according to claim 1, wherein said pressure is increased by injecting a gas into said electrode structure.

5. The method for discharging a cake according to claim 1, wherein said pressure is increased by injecting a liquid into said electrode structure.

6. The method for discharging a cake according to claim 5, wherein said liquid is an electrolyte.

7. The method for discharging a cake according to claim 1, wherein said pressure is increased by reducing the vacuum means applied internally to said electrode structure.

8. A method for discharging a cake according to claim 1, wherein said membrane wall is a bag or plate configuration.

9. A method for discharging a cake according to claim 3, wherein said electrode structure is an anode.

10. A method for discharging a cake according to claim 3, wherein said electrode structure is a cathode.

11. A method for discharging a cake according to claim 1, wherein doctor blades are provided to assist said blowback means in discharging said cake.

12. A method for discharging a cake of suspended solids formed on an electrode structure, said electrode structure comprising an electrode, a membrane wall having an original position disposed about said electrode and forming an electrolyte chamber therein, an electrolyte contained within said electrolyte chamber, the improvement characterized by depositing solids of suspension on the surface of said membrane wall of said electrode structure which is facing away from said electrolyte chamber, such that a cake of solids is formed thereon, increasing pressure within the electrode to outwardly expand the membrane wall to separate the cake from the membrane wall, reducing the pressure within the electrode to restore the membrane wall to original position thereby crimping the bottom edge of the cake, and removing the cake from the membrane wall with a doctor blade without scraping the surface of the membrane.

* * * * *